(No Model.)

R. JESSEE.
ANIMAL TRAP.

No. 312,124. Patented Feb. 10, 1885.

WITNESSES:
Edward D. Mackintosh.
C. Sedgwick.

INVENTOR:
R. Jessee
BY
Munn & Co.
ATTORNEYS.

UNITED STATES PATENT OFFICE.

ROBERT JESSEE, OF LOCUST LANE, VIRGINIA, ASSIGNOR TO WILLIAM W. NICKELS, WILLIAM I. CULBERTSON, AND WILLIAM M. PENDLETON, ALL OF SCOTT COUNTY, VIRGINIA.

ANIMAL-TRAP.

SPECIFICATION forming part of Letters Patent No. 312,124, dated February 10, 1885.

Application filed April 3, 1884. (No model.)

*To all whom it may concern:*

Be it known that I, ROBERT JESSEE, of Locust Lane, in the county of Scott and State of Virginia, have invented a new and Improved Animal-Trap, of which the following is a full, clear, and exact description.

My invention consists in certain improvements in that class of animal-traps that are provided with a rotary partition or sweep released by a pivoted floor or treadle, as will be hereinafter fully described and claimed.

Reference is to be had to the accompanying drawings, forming part of this specification, in which similar letters of reference indicate corresponding parts in all the figures.

Figure 1:
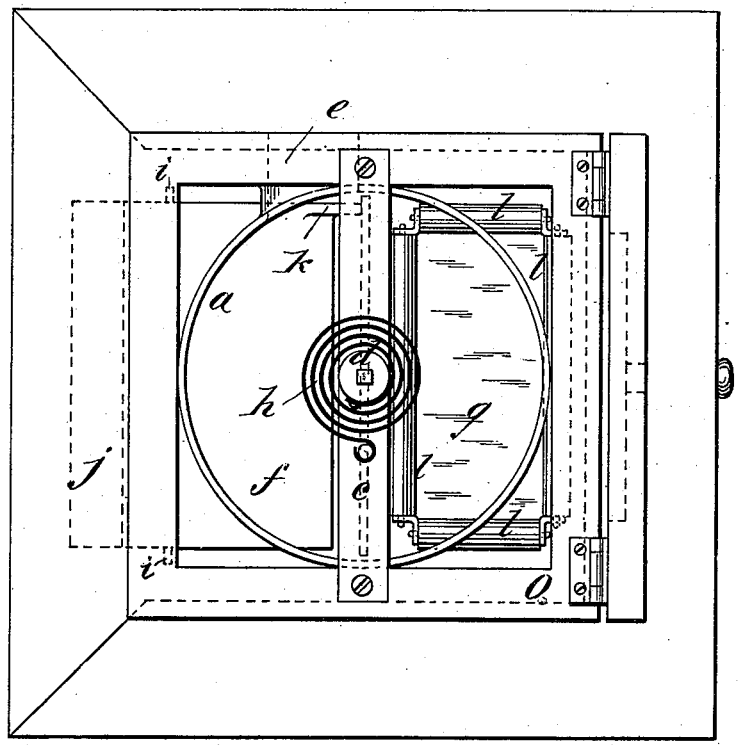
Figure 2:
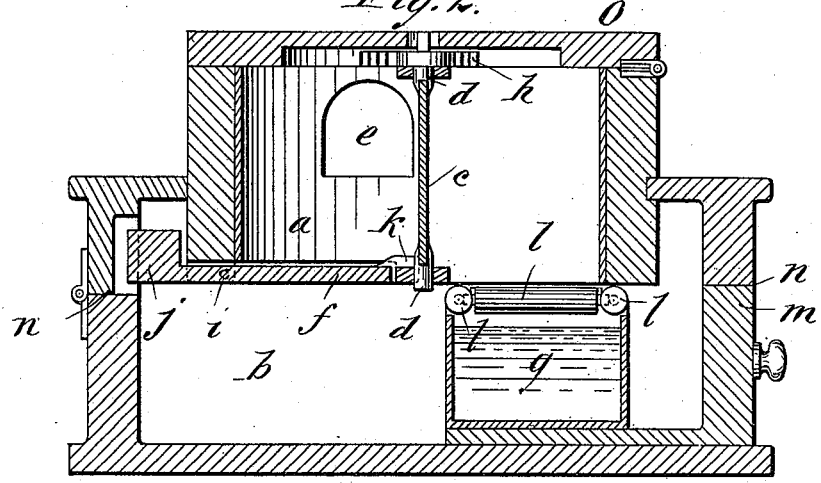

Figure 1 is a plan view of my improved trap, and Fig. 2 is a transverse sectional elevation of the same.

I make a suitable box or case containing an upper circular chamber, $a$, and a lower chamber, $b$, which may be of any form. In the upper chamber I arrange a partition, $c$, on pivots $d$, in the center of said chamber, so that the partition can turn freely to brush or sweep off any object that may enter chamber $a$ through openings $e$ onto floor $f$ into chamber $b$ or into the water-tank $g$, located in said chamber $b$. To turn the partition $c$, I fit a spring, $h$, to its upper pivot, to be wound up and held under tension ready for action when released, and for holding the partition and tripping it I arrange the bottom $f$ on pivots $i$, with a counter-balance, $j$, that will hold the stop-lug $k$ up against the lower edge of the partition in the normal condition of the floor; but the weight of a small animal such as the trap is to be adapted for will depress the floor and release the partition, when the spring will swing the partition around to brush the animal off the floor into the space below. As soon as the floor is relieved of the weight of the animal the floor will rise and stop the partition, thus making the trap self-setting. The water-tank $g$ is fitted to a drawer, $m$, in the side of the case, for convenience in removing and replacing it, and said tank may be provided on its edges with rollers $l$, for preventing the animals from climbing out of the tank. The upper chamber has a door, $o$, at the top for opening and closing it.

The partition $c$ forms when set a division between the floored portion of chamber $a$, into which the animals enter, and the open part of said chamber through which the animals fall into the space below, preventing the escape of animals back to the opening $e$, and insuring the tripping of the partition by the animals entering at $e$.

The case is constructed to open at the joint $n$, and the two parts are hinged together, and will have any approved fastening device.

Having thus fully described my invention, I claim as new and desire to secure by Letters Patent—

An animal-trap consisting of the upper chamber, $a$, containing the rotary partition $c$, and pivoted floor or treadle $f$, for controlling the same, cover $o$, hinged to the top of said chamber, lower chamber, $b$, hinged to the lower part of the upper chamber, the drawer $m$, and tank $g$, mounted in said lower chamber, as shown, whereby the several parts may be readily opened for inspection, repair, and removal of the entrapped animals, as set forth.

ROBERT JESSEE.

Witnesses:
R. J. RICHMOND,
W. J. SPROLES.